United States Patent
Matsui

(10) Patent No.: US 7,742,792 B2
(45) Date of Patent: Jun. 22, 2010

(54) IN-VEHICLE HANDSFREE TELEPHONE SYSTEM

(75) Inventor: Toshio Matsui, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 566 days.

(21) Appl. No.: 11/663,979

(22) PCT Filed: Sep. 26, 2005

(86) PCT No.: PCT/JP2005/018212
§ 371 (c)(1),
(2), (4) Date: Mar. 28, 2007

(87) PCT Pub. No.: WO2006/040951
PCT Pub. Date: Apr. 20, 2006

(65) Prior Publication Data
US 2007/0265040 A1    Nov. 15, 2007

(30) Foreign Application Priority Data
Oct. 13, 2004   (JP)   ............... 2004-298960

(51) Int. Cl.
*H04M 1/00* (2006.01)
(52) U.S. Cl. ............ 455/575.9; 455/569; 455/569.2; 455/568
(58) Field of Classification Search ............ 455/575.9, 455/569.1–569.2, 568, 569
See application file for complete search history.

(56) References Cited

U.S. PATENT DOCUMENTS

| 2002/0173347 | A1* | 11/2002 | Kinnunen ............ 455/569 |
| 2003/0134660 | A1  | 7/2003  | Himmel et al. |
| 2004/0063472 | A1  | 4/2004  | Shimizu et al. |
| 2004/0121783 | A1  | 6/2004  | Chua et al. |
| 2005/0009576 | A1* | 1/2005  | Van Bosch ............ 455/569.2 |

FOREIGN PATENT DOCUMENTS

| EP | 1 156 645 A1 | 11/2001 |
| FR | 2 785 128 | 4/2000 |
| FR | 2 847 409 | 5/2004 |
| JP | A-62-287730 | 12/1987 |
| JP | A-H04-246925 | 9/1992 |
| JP | A 10-190557 | 7/1998 |
| JP | A 2003-174674 | 6/2003 |

OTHER PUBLICATIONS

Oct. 6, 2009 Office Action issued in Japanese Patent Application No. 2004-298960.

* cited by examiner

*Primary Examiner*—Charles N Appiah
*Assistant Examiner*—Michael T Vu
(74) *Attorney, Agent, or Firm*—Oliff & Berridge, PLC

(57) ABSTRACT

In an in-vehicle handsfree telephone system, an in-vehicle handsfree device is capable of transferring a voice signal to a portable terminal in a passenger compartment of a vehicle. An operating state detection unit detects an operating state of the vehicle. The handsfree device is responsive to a user operation and selectively operable in one of a handsfree mode in which talking on the portable terminal through the handsfree device is allowed by the transfer of the voice signal and a portable terminal stand-alone mode in which talking on the portable terminal in isolation is allowed. The handsfree device is configured to have a switching restriction function in which the handsfree device restricts switching between the handsfree mode and the portable terminal stand-alone mode in accordance with a detected operating state of the vehicle.

6 Claims, 3 Drawing Sheets

IN-VEHICLE HANDSFREE TELEPHONE SYSTEM

TECHNICAL FIELD

The present invention relates to an in-vehicle handsfree telephone system which restricts appropriately the mode switching between a handsfree mode and a portable terminal stand-alone mode.

BACKGROUND ART

Conventionally, there is known the technology in which a moving speed detection unit is provided in a radio system, such as a mobile phone, and a moving state of the radio system (or a moving state of the person who uses the radio system) is determined based on a detection result from the moving speed detection unit, and, in response to the detected moving state, automatic switching of the radio system to the handsfree talk mode, regulation of the call origination of the radio system concerned, or notification of a warning message or the like to the person concerned is carried out. For example, see Japanese Laid-Open Patent Application No. 10-190557.

Also known is the technology in which, in order to regulate communication of a portable terminal in the passenger compartment, a sensor unit for detecting the open/close state of a vehicle door is provided, and electromagnetic waves which regulate communication of the portable terminal are transmitted when the door open/close state is detected. For example, see Japanese Laid-Open Patent Application No. 2003-174674.

In recent years, in order to secure safe use of a portable terminal, such as a mobile phone, in the passenger compartment, the use of a handsfree device in the passenger compartment is proposed.

With the use of the handsfree device, connection between the handsfree device and the portable terminal is established at the time of use (typically, in the talking mode) of the portable terminal, and the transmission of a voice signal between the handsfree device and the portable terminal is possible. This eliminates the necessity that the user holds the portable terminal by hand.

However, once the connection is established between the handsfree device and the portable terminal, there has been no mechanism which restricts in any way the mode switching between the handsfree mode in which the handsfree device is used and the portable terminal stand-alone mode in which the portable terminal is used in isolation. For this reason, there is a problem in which the security becomes inadequate in making compatible the convenience of the portable terminal and the safety of the vehicle running.

DISCLOSURE OF THE INVENTION

An object of the present invention is to provide an improved in-vehicle handsfree telephone system in which the above-mentioned problems are eliminated.

A more specific object of the present invention is to provide an in-vehicle handsfree telephone system which can restrict appropriately the mode switching between the handsfree mode and the portable terminal stand-alone mode.

In order to achieve the above-mentioned objects, the present invention provides an in-vehicle handsfree telephone system comprising: an in-vehicle handsfree device which is capable of transferring a voice signal to a portable terminal in a passenger compartment of a vehicle; and an operating state detection unit which detects an operating state of the vehicle, wherein the handsfree device is responsive to a user operation and selectively operable in one of a handsfree mode in which talking on the portable terminal through the handsfree device is allowed by the transfer of the voice signal and a portable terminal stand-alone mode in which talking on the portable terminal in isolation is allowed, and wherein the handsfree device is configured to have a switching restriction function in which the handsfree device restricts switching between the handsfree mode and the portable terminal stand-alone mode in accordance with the operating state of the vehicle detected by the operating state detection unit.

The above-mentioned in-vehicle handsfree telephone system may be configured so that the switching restriction function of the handsfree device is provided to restrict switching from the handsfree mode to the portable terminal stand-alone mode.

Moreover, the above-mentioned in-vehicle handsfree telephone system may be configured so that the switching restriction function of the handsfree device is validated when the detected operating state indicates that the vehicle is running.

Moreover, the above-mentioned in-vehicle handsfree telephone system may be configured so that the switching restriction function of the handsfree device is canceled when the detected operating state of the vehicle indicates that the vehicle stops.

Moreover, the above-mentioned in-vehicle handsfree telephone system may be configured so that the handsfree device comprises a display indication unit which displays a validated/canceled state of the switching restriction function which is visually recognized by the user.

Moreover, the above-mentioned in-vehicle handsfree telephone system may be configured so that mode switching of the handsfree device is performed according to a user's touch operation on a mode selecting switch displayed on the display indication unit, and the displaying of the mode selecting switch is cancelled when the handsfree device is in the handsfree mode and the switching restriction function is validated.

Moreover, the above-mentioned in-vehicle handsfree telephone system may be configured so that the handsfree device comprises an output unit which outputs, when the switching restriction function is validated or canceled, an indication of validation/cancellation of the switching restriction function which is recognizable to the user.

According to the present invention, it is possible to realize an in-vehicle handsfree telephone system which can restrict appropriately the mode switching between the handsfree mode and the portable terminal stand-alone mode.

BEST MODE FOR CARRYING OUT THE INVENTION

A description will now be given of an embodiment of the invention with reference to the accompanying drawings.

Figure 1:
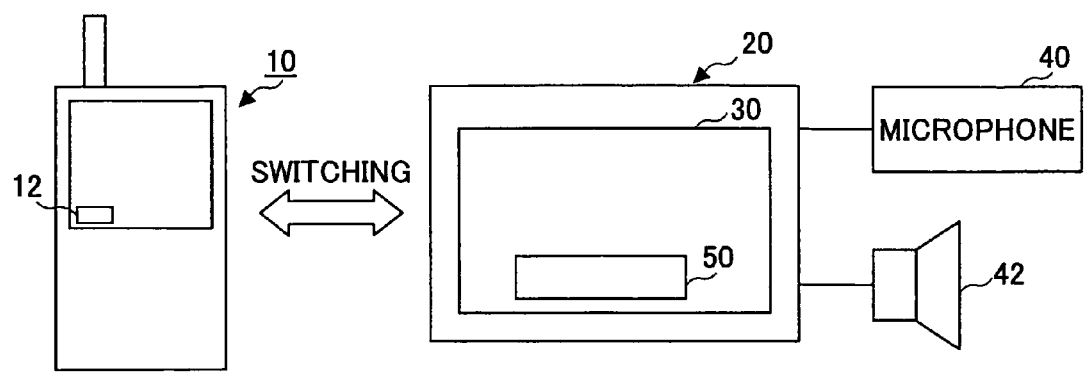
FIG. 1 is a block diagram showing the composition of an embodiment of the in-vehicle handsfree telephone system of the invention.

FIG. 1 shows the composition of an embodiment of the in-vehicle handsfree telephone system of the invention.

As shown in FIG. 1, the in-vehicle handsfree telephone system of this embodiment comprises a portable terminal 10 having a radiophone function, such as a mobile phone or PDA (personal digital assistant), and a handsfree device 20 carried in a vehicle.

The portable terminal 10 may be a mobile phone provided with normal telephone functions. Especially, the portable terminal 10 has the function of enabling talking in the handsfree mode in association with the handsfree device 20, which will be described later.

Specifically, the portable terminal 10 has the external communication function to perform the transmission and reception of electric waves between the portable terminal 10 and an external terminal (typically, another telephone unit), and has the in-vehicle communication function to perform the transmission and reception of voice signals between the portable terminal 10 and the handsfree device 20 through wireless communications, such as Bluetooth wireless communication or wireless LAN communication.

In the following, for the purpose of convenience of description, suppose that the Bluetooth wireless communication is carried out between the portable terminal 10 and the handsfree device 20.

The portable terminal 10 may be what is carried in the passenger compartment when the user enters the passenger compartment. Alternatively, the portable terminal 10 may be a mobile phone of the type that is always held in the passenger compartment.

Figure 2:
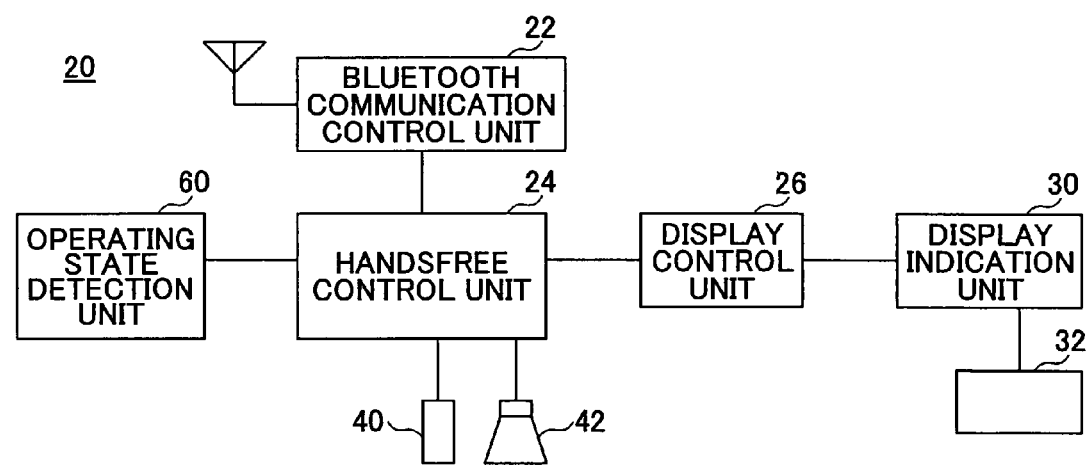
FIG. 2 is a block diagram showing the composition of an embodiment of the handsfree device.

FIG. 2 shows the composition of an embodiment of the handsfree device 20.

As shown in FIG. 2, the handsfree device 20 comprises a Bluetooth communication control unit 22 which controls wireless communications with the portable terminal 10 in conformity with the Bluetooth specifications, a handsfree control unit 24, and a display control unit 26.

The handsfree device 20 is provided with a display indication unit 30, such as a liquid crystal display, and a user input unit 32. For example, in the display indication unit 30, a talking state of the portable terminal 10 and a mode selecting switch 50 (refer to FIG. 1) of the handsfree device 20 etc. is displayed under control of a display control unit 26.

The display indication unit 30 may be provided with a touch-sensitive screen as the user input unit 32.

The handsfree device 20 is provided with a microphone 40 and a loudspeaker 42 which are installed at suitable positions in the passenger compartment.

When the handsfree device 20 is in the handsfree mode (which will be described later), the microphone 40 takes up the voice of the user who speaks in the passenger compartment, and the loudspeaker 42 outputs the voice signal from the portable terminal 10 to the user in the passenger compartment.

The voice signal detected by the microphone 40 is subjected to the predetermined processing, such as amplification, and the processed voice signal is transmitted (or transferred) to the portable terminal 10 through the Bluetooth communication control unit 22.

The handsfree device 20 may be built in a navigation device which is usually carried in the vehicle. In this case, the respective control units 22, 24 and 26 may be embodied on a navigation ECU (electronic control unit), and the display indication unit 30 and the user input unit 32 may be embodied on a display unit of the navigation device.

Various electronic parts in the vehicle are connected to the handsfree device 20 via a suitable bus such as CAN (controller area network). In particular, the operating state detection unit 60 which detects the operating state of the vehicle is connected to the handsfree device 20. The operating state detection unit 60 may be a wheel speed sensor for detecting a vehicle speed.

Next, the basic operation of the portable terminal 10 and the handsfree device 20 which are the requisite for application of the invention will be explained.

Connection between the portable terminal 10 and an external terminal is established as a result of sending a call from the portable terminal 10 or receiving a call from the external terminal at the portable terminal 10, to start the communications therebetween.

In this state, the handsfree device 20 of this embodiment is selectively operable in one of the handsfree mode and the portable terminal stand-alone mode according to user operation.

In the handsfree mode, the voice signal which the portable terminal 10 receives from the external terminal is transmitted to the handsfree device 20 via the antenna unit of the Bluetooth communication control unit 22, and the voice signal is subjected to the predetermined processing, such as amplification, by the handsfree control unit 24, so that the processed voice signal is outputted from the loudspeaker 42.

On the other hand, the voice of the user in the passenger compartment is detected by the microphone 40, and the voice signal is subjected to the predetermined processing, such as amplification, by the handsfree control unit 24, so that the process voice signal is transmitted to the portable terminal 10 via the antenna unit of the Bluetooth communication control unit 22.

The voice signal thus transmitted to the portable terminal 10 is transmitted to the external terminal via the antenna unit of the portable terminal 10.

In the handsfree mode, the user can talk over the telephone without holding the portable terminal 10 by hand, and the user's operation to maneuver the vehicle is not interfered with. Thus, the handsfree mode is a suitable talk mode for use when the vehicle is running from the viewpoint of the safety of the vehicle.

On the other hand, in the portable terminal stand-alone mode, the user has to hold the portable terminal 10 by hand or the portable terminal 10 has to be held at a suitable position when the user talks over the telephone. In the portable terminal stand-alone mode, the handsfree device 20 does not interfere with the talking on the portable terminal 10, and serves only to monitor the talk state of the portable terminal 10.

In the portable terminal stand-alone mode, the user's operation to maneuver the vehicle may be interfered with, and therefore, the portable terminal stand-alone mode is an unsuitable talk mode for use when the vehicle is running from the viewpoint of the safety of the vehicle.

The mode switching between the handsfree mode and the portable terminal stand-alone mode is carried out in response to a user operation on the user input unit 32 of the handsfree device 20.

For example, a mode selecting switch 50 which indicates the present talk mode (handsfree mode or portable terminal stand-alone mode) may be displayed on the display indication unit 30, and the mode switching is carried out by a user's touch operation to the mode selecting switch 50 concerned.

Alternatively, the mode switching between the handsfree mode and the portable terminal stand-alone mode may be carried out in response to a user operation to a similar mode selecting switch 12 (refer to FIG. 1) of the portable terminal 10.

As described above, in the present embodiment, the user's intention is fundamentally respected, and this embodiment is characterized by the feature that the mode switching between the handsfree mode and the portable terminal stand-alone mode is restricted in an appropriate manner.

Figure 3:
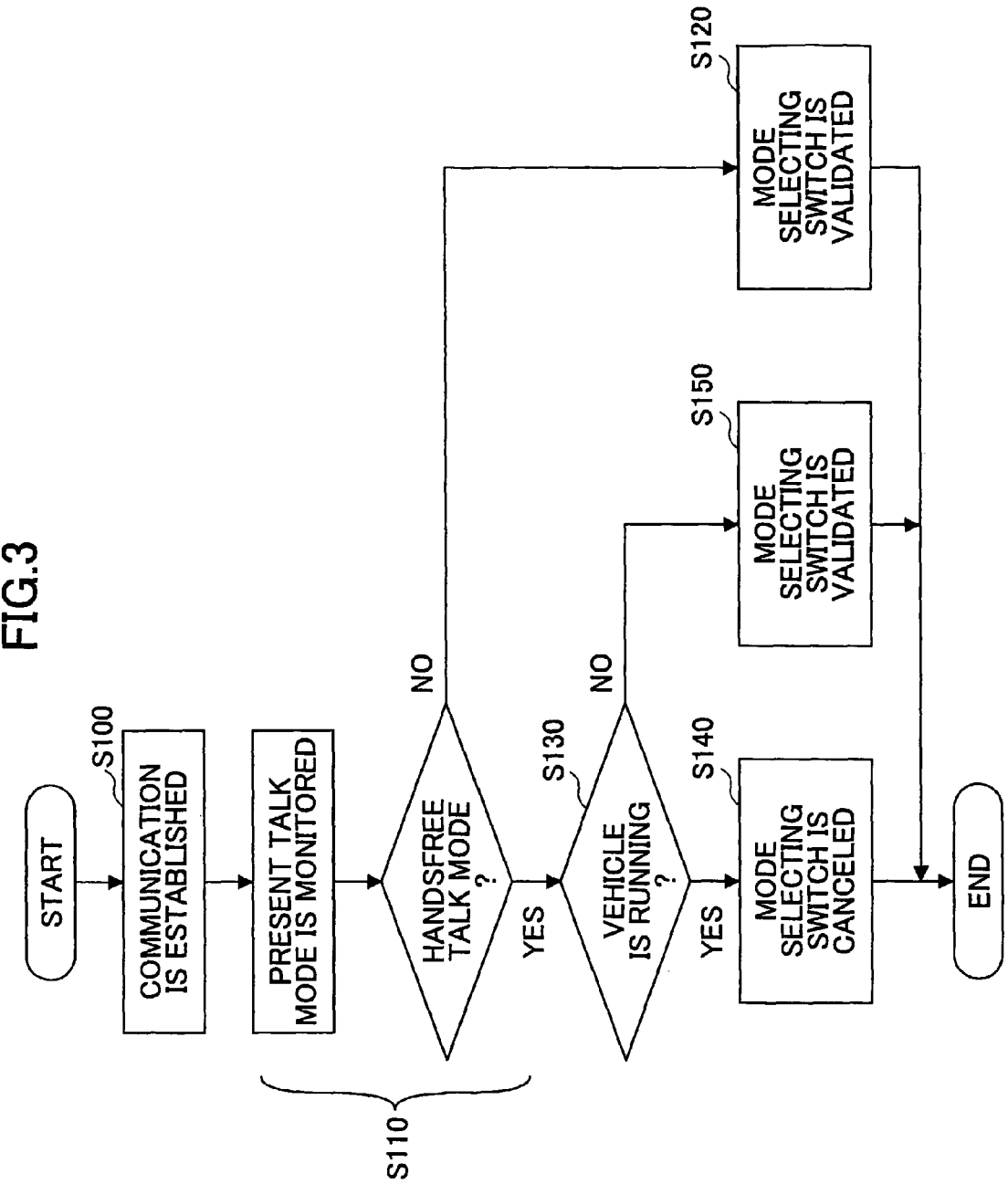
FIG. 3 is a flowchart for explaining the main processing performed by the handsfree device of this embodiment.

Next, this characteristic composition will be explained. FIG. 3 is a flowchart for explaining the processing performed by the in-vehicle handsfree telephone system of this embodiment.

At step 100, connection between the portable terminal 10 and an external terminal is established to start the communications therebetween.

For example, when a call from the external terminal is received at the portable terminal 10 in the passenger compartment of the vehicle, the Bluetooth communication control unit 22 of the handsfree device 20 detect the arrival of the call concerned, and the handsfree control unit 24 causes the display control unit 26 to display a message "under call arrival" on the display indication unit 30, for example.

Under the present circumstances, if the user pushes the answer button of the portable terminal 10, the handsfree control unit 24 causes the display control unit 26 to display a message "under connection" on the display indication unit 30, and the talking in the portable terminal stand-alone mode may be started. Alternatively, the user's push of the answer button of the display indication unit 30 may cause the handsfree device 20 to start the talking in the handsfree mode.

Similarly, when a call from the portable terminal 10 is transmitted to an external terminal, the Bluetooth communication control unit 22 of the handsfree device 20 detects the transmission of the call concerned, and the handsfree control unit 24 causes the display control unit 26 to display a message "under call sending" on the display indication unit 30, for example.

Under the present circumstances, if the user of the external terminal answers, the handsfree control unit 24 causes the display control unit 26 to display a message "under connection" on the display indication unit 30, and the talking in the portable terminal stand-alone mode may be started. Alternatively, the transmission of a call to the external terminal from the portable terminal 10 may be performed by the user's input of a destination telephone number to the display indication unit 30 through the user input unit 32. Under the present circumstances, if the user of the external terminal answer, the talking in the handsfree mode may be started.

If the communication between the external terminal and the portable terminal 10 is established and started, the handsfree control unit 24 monitors the present talk mode until the communication is cut off (step 110).

At step 120, when the present talk mode is not the handsfree mode, the handsfree control unit 24 validates the mode selecting switch 50 in the display indication unit 30 through the display control unit 26.

In this case, the user can realize switching from the portable terminal stand-alone mode to the handsfree mode by performing a touch operation of the mode selecting switch 50.

At step 130, when the present talk mode is the handsfree mode, the handsfree control unit 24 determines whether the vehicle is running or not, based on a detection result of the wheel speed sensor (or the operating state detection unit 60).

When the vehicle is running (or when the vehicle speed is larger than zero or larger than a certain low speed), the handsfree control unit 24 cancels the mode selecting switch 50 in the display indication unit 30 through the display control unit 26 (step 140).

In this case, even if the user performs touch operation of the mode selecting switch 50, the user cannot realize the switching from the handsfree mode to the portable terminal stand-alone mode.

On the other hand, when the vehicle is not running, the handsfree control unit 24 validates the mode selecting switch 50 in the display indication unit 30 through the display control unit 26 (step 150).

In this case, the user can realize the switching from the handsfree mode to the portable terminal stand-alone mode by performing touch operation of the mode selecting switch 50.

According to this embodiment, only when the vehicle is running, the switching from the handsfree mode to the portable terminal stand-alone mode is restricted. Thus, it is possible to restrict the talking in the portable terminal stand-alone mode during the running of the vehicle while the user's mode switching operation is respected as much as possible.

In the above-described embodiment, when the vehicle is running, the mode selecting switch 12 on the side of the portable terminal 10 may still be validated.

Alternatively, the portable terminal 10 in the above embodiment may be constituted so that the valid/invalid state of the mode selecting switch 12 is switched in synchronism with the state of the mode selecting switch 50 of the handsfree device 20.

It should be noted that validation/cancellation of the mode selecting switch 50 in the above-described embodiment means that the mode switching is realized by a user operation or not, and this does not mean that physical operation of the mode selecting switch 50 is allowed or not.

Preferably, the mode selecting switch 50 is constituted so that the state (valid state/invalid state) of the mode selecting switch can be recognized by the user. For example, the mode selecting switch 50 at the time of valid state is normally displayed, and display indication of the mode selecting switch 50 at the time of invalid state is not performed. Alternatively, the mode selecting switch 50 at the time of invalid state may be displayed as the tone-down display (inactive display) which indicate the state in which no operation is accepted. Thereby, the user can easily judge whether the mode switching is currently possible, based on the displaying condition of the mode selecting switch 50.

Similarly, the above-described embodiment may be constituted so that when the mode selecting switch 50 at the time of invalid state is operated by the user, a message indicating that the mode switching is currently invalid (or the state in which the mode switching is restricted) is audibly or visually outputted. Thereby, the user can recognize that the user's own operation is invalid and the switching from the present handsfree mode to the portable terminal stand-alone mode is forbidden.

It is desirable in the above-described embodiment that, when permission of the switching from the handsfree mode to the portable terminal stand-alone mode is changed to prohibition or vice versa (when prohibition is changed to permission), a notification of such change that is recognizable to the user is audibly or visually outputted. Thereby, the user can easily judge whether the mode switching is currently possible, and when the mode switching prohibition state is canceled, the user can immediately perform switching from the handsfree mode to the portable terminal stand-alone mode.

Figure 4:
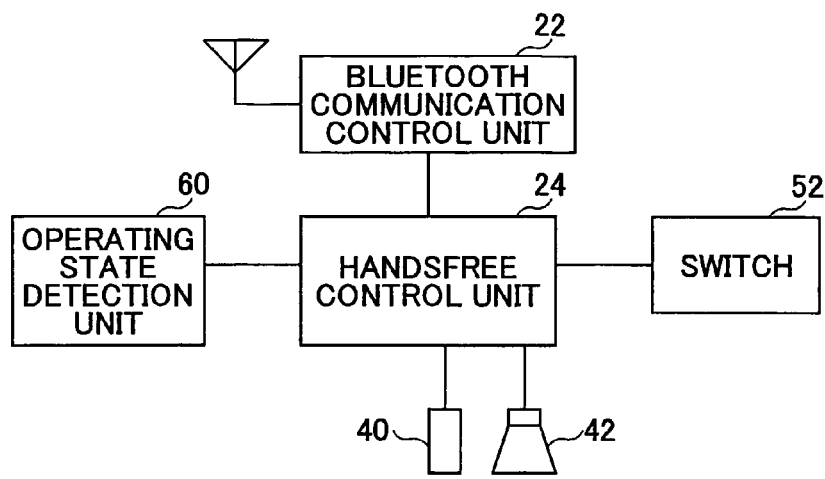
FIG. 4 is a block diagram showing the composition of another embodiment of the handsfree device.

FIG. 4 shows the composition of another embodiment of the handsfree device 20.

In the embodiment shown in FIG. 4, a mechanical mode selecting switch 52 is provided instead of, or in addition to, the mode selecting switch 50 displayed on the display indication unit 30 of the handsfree device 20 in the previously described embodiment.

In the present embodiment, the user can realize the mode switching between the handsfree mode and the portable terminal stand-alone mode by operating the mechanical mode selecting switch 52 in a manner similar to the mode selecting switch 50 in the previously described embodiment.

In this case, validation/cancellation of the mechanical mode selecting switch 52 may be realized by inhibiting the operation of the mode selecting switch 52 itself using a mechanical locking mechanism (not shown). Alternatively, it may be constituted so that the operation of the mode selecting switch 52 is permitted but a signal generated by the operation is disabled internally. Alternatively, it may be constituted so that an indicator is provided in the mode selecting switch 52, and the output of the indicator enables judgment of validation/cancellation.

Moreover, for the same reason, the user input unit 32 may include, in addition to the touch-sensitive screen, various input switches provided in the main part of the handsfree device 20 or the usual remote controller in the above-mentioned embodiment.

Figure 5:
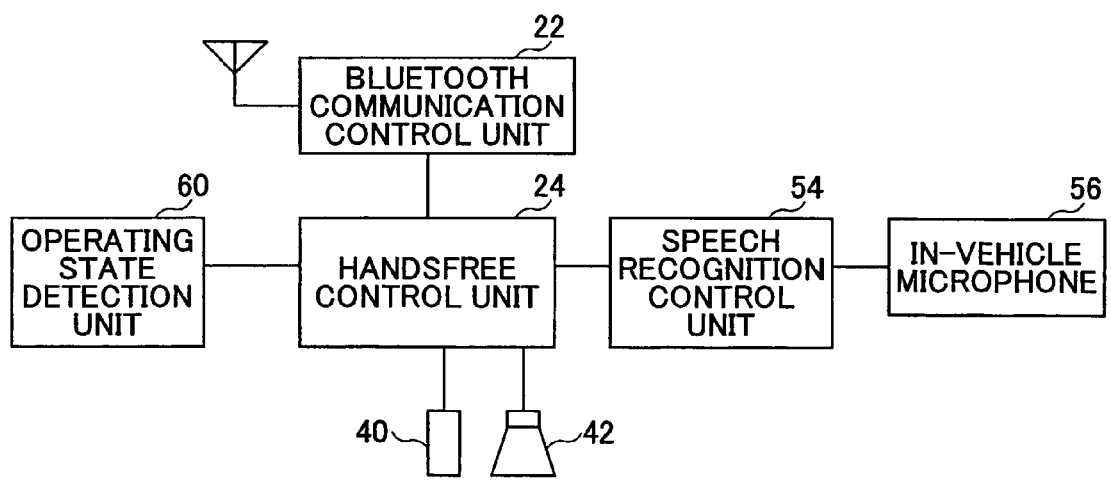
FIG. 5 is a block diagram showing the composition of another embodiment of the handsfree device.

FIG. 5 shows the composition of another embodiment of the handsfree device 20.

In the embodiment shown in FIG. 5, a speech recognition control unit 54 and an in-vehicle microphone 56 are provided instead of, or in addition to, the mode selecting switch 50 displayed on the display indication unit 30 of the handsfree device 20 in the previously described embodiment.

In the present embodiment, the user can realize the mode switching between the handsfree mode and the portable terminal stand-alone mode by giving switching instructions to the microphone 56 by voice in a manner similar to the mode selecting switch 50 in the previously described embodiment.

In this case, the speech recognition control unit 54 comprises the speech recognition engine which has an appropriate acoustic model, an appropriate language model, etc., and carries out the speech recognition processing of the voice signal inputted through the microphone 56, so that the speech recognition control unit 54 recognizes the user's instructions.

The handsfree control unit 24 realizes the mode switching between the handsfree mode and the portable terminal stand-alone mode based on a recognition result of the user's instructions which is created by the speech recognition control unit 54 through the speech recognition.

The above-mentioned embodiment may be configured so that, when the switching from the handsfree mode to the portable terminal stand-alone mode is inhibited, a display indication that indicates the inhibition of the mode switching is displayed on the display indication unit 30, and the speech recognition control unit 54 is set in an inactive state in accordance with the display indication.

Alternatively, the above-mentioned embodiment may be configured so that, when the switching from the handsfree mode to the portable terminal stand-alone mode is inhibited, the handsfree control unit 24 functions to intercept the switching instructions outputted by the speech recognition control unit 54 as a recognition result.

As in the foregoing, the preferred embodiments of the invention have been explained in detail. However, the present invention is not limited to the above-described embodiments and variations and modifications may be made without departing from the scope of the present invention.

For example, in the above-mentioned embodiments, the operating state of the vehicle is determined based on the detection result of the wheel speed sensor. However, the operating state or idle state of the vehicle may be determined in various manners based on the operating state of various electronic parts, such as the operating state of a brake device, and the operating state of a gearshift.

For example, the operating state of the vehicle may be determined when the engine is ON state, the gearshift is set at the D range, and the brake pedal is not operated. Conversely, the idle state of the vehicle may be determined when the engine is ON state and the gearshift is set at the N range or the P range, or when the brake pedal is operated or the emergency brake is operated.

The invention claimed is:

1. An in-vehicle handsfree telephone system comprising:
an in-vehicle handsfree device adapted to transfer a voice signal to a portable terminal in a passenger compartment of a vehicle;
an operating state detection unit adapted to detect an operating state of the vehicle,
wherein the in-vehicle handsfree device is responsive to a user operation and selectively operable in one of a handsfree mode in which talking on the portable terminal through the in-vehicle handsfree device is allowed by the transfer of the voice signal and a portable terminal stand-alone mode in which talking on the portable terminal is allowed without interference of the in-vehicle handsfree device,
wherein the in-vehicle handsfree device is configured to have a switching restriction function in which the in-vehicle handsfree device is adapted to restrict switching from the handsfree mode to the portable terminal stand-alone mode in accordance with the operating state of the vehicle detected by the operating state detection unit, and
wherein the mode switching operation of the in-vehicle handsfree device is performed according to a user's operation, such that:
when the in-vehicle handsfree device is in the handsfree mode and the detected operating state indicates that the vehicle is running, the switching restriction function of the in-vehicle handsfree device is validated to restrict switching from the handsfree mode to the portable terminal stand-alone mode, and,
when the in-vehicle handsfree device is in the portable terminal stand-alone mode and the detected operating state indicates that the vehicle is running, the switching restriction function of the handsfree device is cancelled to allow switching from the portable terminal stand-alone mode to the handsfree mode.

2. The in-vehicle handsfree telephone system according to claim 1 wherein the switching restriction function of the in-vehicle handsfree device is cancelled when the detected operating state of the vehicle indicates that the vehicle stops.

3. The in-vehicle handsfree telephone system according to claim 1 wherein the in-vehicle handsfree device comprises a display indication unit which is adapted to display a validated/cancelled state of the switching restriction function which is visually recognizable by the user.

4. The in-vehicle handsfree telephone system according to claim 3 wherein mode switching of the in-vehicle handsfree device is performed according to the user's touch operation on a mode selecting switch displayed on the display indication unit, and the displaying of the mode selecting switch is cancelled when the in-vehicle handsfree device is in the handsfree mode and the switching restriction function is validated.

5. The in-vehicle handsfree telephone system according to claim 4 wherein the in-vehicle handsfree device comprises an output unit which is adapted to output, when the switching restriction function is validated or canceled, an indication of validation/cancellation of the switching restriction function which is recognizable to the user.

6. The in-vehicle handsfree telephone system according to claim 1, wherein the an operating state detection unit is a wheel speed sensor.

* * * * *